United States Patent [19]

Bondie

[11] 3,792,855

[45] Feb. 19, 1974

[54] WORKPIECE SUPPORT APPARATUS

[75] Inventor: Dale J. Bondie, Fowlerville, Mich.

[73] Assignee: Ex-Cell-O Corporation, Detroit, Mich.

[22] Filed: Aug. 30, 1972

[21] Appl. No.: 284,811

[52] U.S. Cl. .................................. 269/310, 279/74
[51] Int. Cl. ............................................. B23q 3/02
[58] Field of Search ..... 269/90, 153, 166, 167, 217, 269/229, 287, 289, 292, 294, 303, 304, 305, 306, 309, 310, 315, 316, 317, 318, 319, 320; 279/74, 122

[56] References Cited
UNITED STATES PATENTS

| 1,254,044 | 1/1918 | Johnson | 269/316 X |
| 3,449,782 | 6/1969 | Hunt | 279/74 X |
| 1,233,921 | 7/1917 | Ross | 279/74 |
| 2,593,538 | 4/1952 | Cleveland | 269/310 |
| 3,325,145 | 6/1967 | Bertuch | 254/104 |

Primary Examiner—Harold D. Whitehead
Assistant Examiner—Mark S. Bicks

[57] ABSTRACT

A workpiece support apparatus for mounting in position adjacent a workpiece to provide positive back-up support and prevent deflection of the workpiece during a machining operation thereon. The workpiece support apparatus includes a housing having a first bore formed therein and a second bore formed perpendicularly to said first bore and communicating therewith. A workpiece support pin is adjustably mounted in the second bore and it has one end extended outwardly of the housing for operative engagement with a workpiece. A collet member and a collet operating bushing are operatively mounted in the second bore around the support pin for releasably locking the pin in an adjusted position. A manually operable wedge is movably mounted in the first bore, and it is adapted to operatively engage the collet operating bushing for moving the collet member from an inoperative position to a support pin locking position.

4 Claims, 5 Drawing Figures

PATENTED FEB 19 1974  3,792,855

WORKPIECE SUPPORT APPARATUS

SUMMARY OF THE INVENTION

This invention relates generally to the machine tool art and more particularly to a workpiece support apparatus for providing a positive back-up support for an unstable workpiece when it is undergoing a machining operation.

A common problem encountered in the machining of unstable workpieces is that they are subject to being deflected due to the forces exerted thereon during a machining operation. The workpiece support apparatus of the present invention is adapted to overcome this deflection problem of unstable workpieces during the machining by providing a positive back-up support or steady rest structure which absorbs vibrations caused by a machining operation and which permits the machining of close tolerances on such unstable workpieces.

It is an object of the present invention to provide a novel and improved workpiece support apparatus which comprises, a housing having a workpiece support pin adjustably mounted therein and having one end extended outwardly of the housing for operative engagement with a workpiece to provide back-up support to a workpiece during a machining operation, and means operatively mounted in said housing for releasably locking said workpiece support pin in an adjusted position in said housing.

It is another object of the present invention to provide a workpiece support apparatus for use in machining unstable workpieces, and which support apparatus is simple and compact in structure, economical to manufacture and efficient in operation.

It is still another object of the present invention to provide a workpiece support apparatus which includes a workpiece support pin which is adjustably mounted in a housing and normally biased by a spring means outwardly of the housing and into a back-up support position against the workpiece. The workpiece support apparatus further includes a collet clamping means for locking the support pin in an adjusted position and a manually operated wedge member for moving the collet clamping means into a locking position.

Other features and advantages of this invention will be apparent from the following detailed description, appended claims, and the accompanying drawing.

DESCRIPTION OF THE PREFERRED EMBODIMENT

Figure 1:
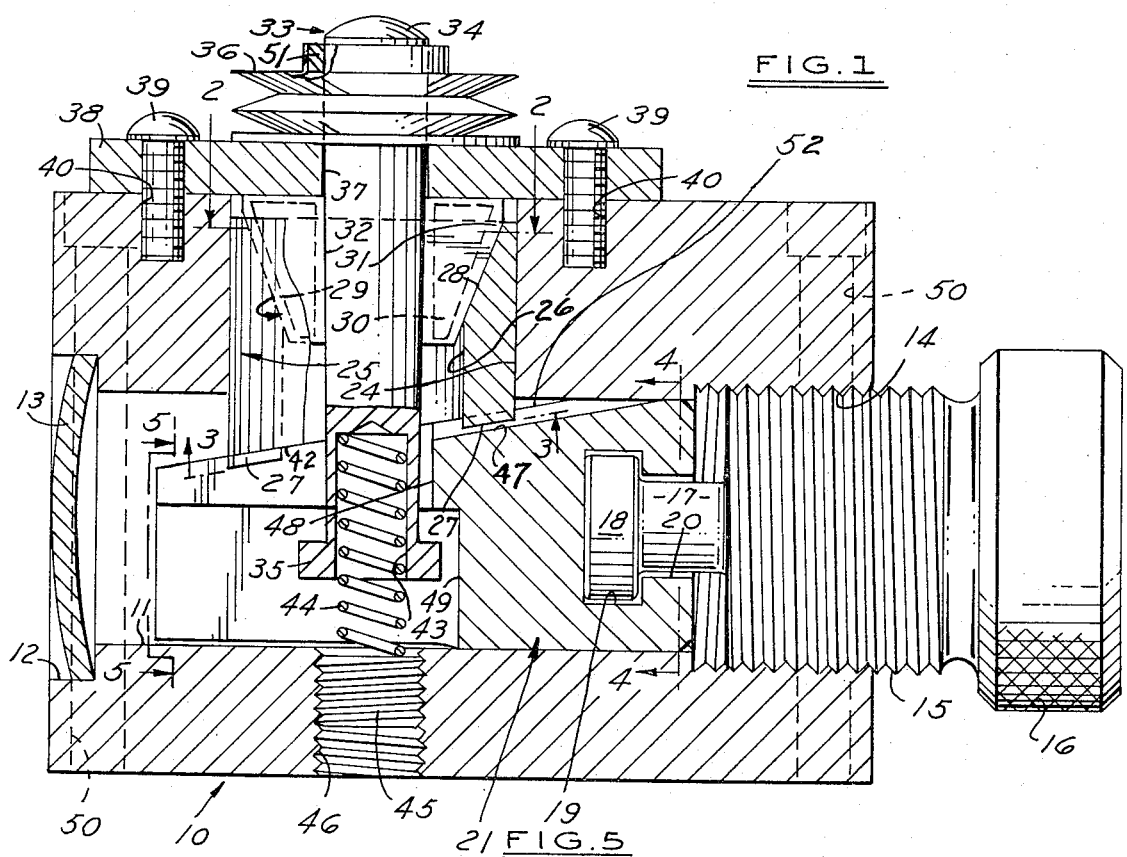
FIG. 1 is a longitudinal, elevational, section view, with parts broken away, of an illustrative embodiment of a workpiece support apparatus made in accordance with the principles of the present invention.
Figure 4:
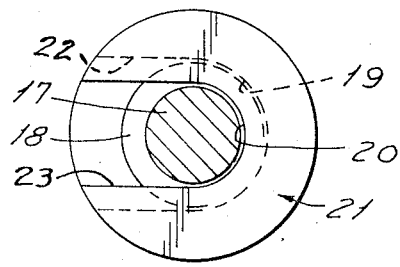
FIG. 4 is a fragmentary, elevational, section view of the structure illustrated in FIG. 1, taken along the line 4—4 thereof, and looking in the direction of the arrows.

Referring now to the drawing and in particular to FIG. 1, the numeral 10 generally designates a housing which is illustrated as being of rectangular block form and in which is provided a longitudinally extended, horizontal, first bore 11. As viewed in FIG. 1, the left end portion of the bore 11 is enlarged, as indicated by the numeral 12. A suitable plug 13 is forced into the bore portion 12 for closing the same. The right end portion of the bore 11 is enlarged and threaded, as indicated by the numeral 14. A wedge adjusting screw 15 is rotatably mounted in the bore 14, and it is provided with a hand knob 16 on the outer end thereof. An axial shaft 17 is integrally formed on the inner end of the adjusting screw 15, and a cylindrical head 18 is integrally formed on the outer end of the shaft 17 to function with the shaft 17 to provide a T-head connector means for connecting the adjusting screw 15 to a wedge member generally indicated by the numeral 21. As shown in FIG. 1, the T-head connector 18 and its shaft 17 are rotatably mounted in a T-head socket 19, formed in the outer end of the wedge 21, and the bore 20 which extends inwardly from the outer end of the wedge 21 to communicate with the socket 19. As shown in FIG. 4, the T-head socket 19 and the bore 20 are open to the exterior of the wedge 21 by the interconnecting side opening slots 22 and 23, respectively.

As shown in FIG. 1, the housing 10 includes a second bore 24 which is disposed in the upper end of the housing and which is perpendicular to and communicates with the first bore 11. A cylindrical collet bushing 25 is slidably mounted in the bore 24. As best seen in FIG. 1, the collet bushing 25 is provided with the bore 26 formed through its lower end. An internal conical recess or seat 28 is formed in the upper end of the collet bushing 25 and it communicates with the bore 26.

Figure 2:
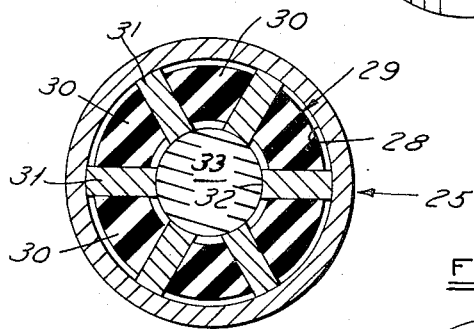
FIG. 2 is a fragmentary, horizontal section view of the structure illustrated in FIG. 1, taken along the line 2—2 thereof, and looking in the direction of the arrows.

A locking collet member, generally indicated by the numeral 29, is operatively seated in the internal conical recess 28 in the bushing member 25, and it is inverted conical in shape, and includes a plurality of longitudinally disposed collet gripping blades or members 31 which are secured together by a plurality of resilient, flexible connectors 30. As shown in FIG. 2, the collet blades 31 are circumferentially disposed about a bore 32 formed through the collet member 29. The collet gripping blades 31 extend radially outward beyond the outer periphery of the flexible connector members 30 which are adhered to the blades 31 by any suitable means, as by suitable adhesive, or by a suitable bonding means. It will best be seen from FIG. 2 that the collet blades 31 extend radially inwardly beyond the inner periphery of the flexible connector members 30.

The collet member axial bore 32 tapers convergently inward and slidably receives a mating tapered steady rest workpiece support pin, generally indicated by the numeral 33. As shown in FIG. 1, the pin 33 is provided with a rounded, outer end 34 which extends out of the housing 10 and into an operative supporting engagement with a workpiece. The inner end of the support pin 33 is provided with an integral, radially outward extended flange 35 which forms a shoulder that limits the outer movement of the pin.

The support pin 33 has a large outer diameter at the supporting outer end, and the diameter converges or tapers inwardly to a smaller dimension at the shoulder 35 at the inner end. The purpose of this taper is to provide an increasing force against the locking collet 29 as machining forces are applied to the outer end of the supporting pin 33.

The support pin 33 extends outwardly of the housing 10 through a bore 37 formed in a cover plate 38. The cover plate 38 is releasably secured to the housing 10 by a pair of suitable machine screws 39 which are threadably mounted in threaded bores 40 in the housing 10. The portion of the support pin 33 which protrudes outwardly beyond the cover plate 38 is surrounded by a suitable dust boot 36 which has its inner end adhered to the cover plate 38 by a suitable adhesive. The outer end of the boot 36 is adhered by a suitable adhesive to a collar 51 which is fixedly secured to the pin 33 by any suitable means, as by a press fit.

The workpiece support pin 33 is provided at its inner end with an axial, inwardly extended spring socket 43 in which is seated the inner end of a coil spring 44. The outer end of the spring 44 is seated against the inner end of a suitable screw 45, as, for example, a flat, pointed, Allen screw. The screw 45 is threadably mounted in a suitable threaded bore 46 which extends through the lower end of the housing 10 and which communicates with the first bore 11. The screw 45 may be adjusted inwardly and outwardly to adjust the pressure on the spring 44. The spring 44 functions to normally bias the workpiece support pin 33 upwardly, as shown in FIG. 1.

Figure 5:
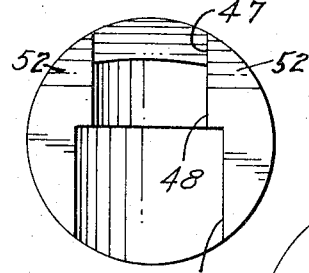
FIG. 5 is a fragmentary, elevational, section view of the structure illustrated in FIG. 1, taken along the line 5—5 thereof, and looking in the direction of the arrows.
Figure 3:
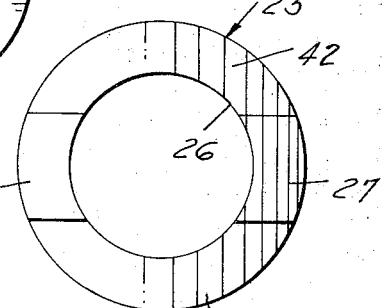
FIG. 3 is a fragmentary, section view of the structure illustrated in FIG. 1, taken along the line 3—3 thereof, and looking in the direction of the arrows.

As shown in FIGS. 1 and 3, the lower end of the collet bushing 25 is provided with a pair of oppositely disposed and axially, outward extended cam guide fingers 27 which are flanked by a pair of sloping cam surfaces 42. FIG. 5 is a front end, elevational view of the wedge 21, and it shows the tapered, spaced apart cam surfaces 52 which are formed along either side of the top of the wedge 21. The cam surfaces 52 slope inwardly and downwardly, as shown in FIG. 1, at an angle complementary to the downwardly and inwardly sloping surfaces 42 on the collet bushing 25. The cam guide fingers 27 on the collet bushing 25 are adapted to extend into a longitudinally extended and centrally disposed groove 47 which is formed on the upper side of the wedge 21 between the cam surfaces 52.

The wedge 21 is provided with a first U-shaped, longitudinally inward extended slot 48 in the front end thereof through which the support pin 38 extends. The wedge 21 is further provided with a second U-shaped slot 49 which is slightly longer than the slot 48 and slightly wider, as shown in FIGS. 1 and 5. The lower end of the support pin 33 is nested in the lower U-shaped slot 49. The spring 44 biases the support pin 33 upwardly, as shown in FIG. 1, and when the pin 33 is not locked in place, the flange 35 abuts the shoulder formed between the lower end of the U-shaped slot 48 and the upper end of the slot 49.

As shown in FIG. 1, the housing 10 is provided with a plurality of machine screw bores 50, and it is secured in place on a workpiece supporting table or other means by suitable machine screws.

In use, the housing 10 would be mounted in a position adjacent an unstable workpiece which is to be provided with a back-up support. The wedge screw 15 is rotated in the proper direction to move the wedge 21 to the right, as viewed in FIG. 1, to release the collet locking pressure on the support pin 33. The housing is located so as to bring the round end 34 of the support pin 33 into position against a workpiece to provide the desired backup supporting action. As, for example, if the workpiece is a thin, large diameter flange, the housing 10 would be positioned to bring the support pin 33 in a position to engage the rear side of the flange if machining is to be carried out on the front side of the flange. It will be understood that as many back-up support apparatuses of the present invention may be employed as is desired, or as may be required due to the particular shape of a workpiece. The pressure on the workpiece is adjustable, since the support pin 33 is spring-biased outwardly and the back-up pressure exerted by the support pin 33 may be controlled by the position of the housing 10 relative to the workpiece, as well as by adjusting the spring adjusting screw 45, as desired.

After the housing 10 has been set in the desired position, with the desired location of the support pin 33, the wedge screw 15 is then rotated to move the wedge 21 inwardly, whereby the wedge cams the collet bushing 25 upwardly and into a locking engagement with the collet 29. The surface of the internal conical seat 28 in the bushing 25 slides upwardly relative to the complementary conical outer surfaces of the pin gripping collet plates 30 and forces these plates radially inward into a gripping and locking engagement with the support pin 33. The cover plate 38 retains the collet structure 29 in the bore 24. The support pin 33 may be unlocked by merely reversing the last mentioned action; that is, by turning the screw 15 so as to move the wedge 21 outwardly or to the right, as viewed in FIG. 1.

It will be seen that the pin back-up pressure can be controlled so as not to induce any unwanted forces into a workpiece. In one embodiment, the back-up pin 33 had a supporting range or movement stroke of three-eighths inches, and it could be positively clamped within any part of such stroke. It has been found that the apparatus of the present invention provides an efficient workpiece support structure which prevents deflection of an unstable workpiece during a machining operation thereon, and that it can be quickly and easily mounted in an operative position adjacent a workpiece.

While it will be apparent that the present embodiment of the invention herein disclosed is well calculated to fulfill the objects above stated, it will be appreciated that the invention is susceptible to modification, variation and change.

I claim:

1. A workpiece support apparatus comprising:
    a. a housing adapted to be disposed adjacent a workpiece on a workpiece supporting means;
    b. a workpiece support pin adjustably mounted in said housing and having one end extended outwardly of said housing for supporting engagement with a workpiece to provide back-up support to the workpiece during a machining operation;
    c. means for normally biasing said workpiece support pin outwardly of said housing;
    d. locking means operatively mounted in said housing for releasably locking said workpiece support pin in an adjusted position in said housing; said locking means includes:

1. a collet member operatively mounted around said support pin mounted in said housing for releasably gripping said workpiece support pin to lock it in an adjusted position;
2. a collet operating bushing movably mounted in said housing;
3. a wedge member movably mounted in said housing and operatively engaging said collet bushing for moving said bushing between an inoperative position and an operative position, whereby when said bushing is in the operative position it forces the collet member into a gripping engagement with said support pin to lock the support pin in an adjusted position; and,
4. means for moving said wedge member.

2. A workpiece support apparatus as defined in claim 1, wherein:
   a. said collet member comprises a conically shaped body including a plurality of circumferentially spaced apart gripping members which are secured together by a plurality of interconnecting resilient and flexible members; and,
   b. said collet bushing comprises a cylindrical member having an internally coned recess in one end thereof in which is operatively received said conically shaped collet body, and a cam means formed on the other end thereof for operative engagement by said wedge member.

3. A workpiece support apparatus as defined in claim 1, wherein:
   a. said wedge member is movably mounted in a first bore in said housing;
   b. said workpiece support pin, collet member, and collet operating bushing are movably mounted in a second bore in said housing which is disposed perpendicular to said first bore and in communication therewith; and,
   c. said housing is provided with means operatively mounted over said second bore for retaining said collet member therein.

4. A workpiece support apparatus as defined in claim 1, wherein:
   a. said collet member is provided with a convergently inward taper; and,
   b. the outer diameter of the support pin tapers convergently inward.

* * * * *